United States Patent
Akita et al.

(10) Patent No.: US 9,124,851 B2
(45) Date of Patent: Sep. 1, 2015

(54) VIDEO-DISPLAY CONTROL DEVICE FOR CORRECTING A VIDEO SIGNAL AND CONTROLLING A BACKLIGHT

(75) Inventors: Takashi Akita, Osaka (JP); Takuma Shimura, Kanagawa (JP); Terumitsu Suenaga, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 13/811,285

(22) PCT Filed: Aug. 23, 2011

(86) PCT No.: PCT/JP2011/004676
§ 371 (c)(1),
(2), (4) Date: Jan. 21, 2013

(87) PCT Pub. No.: WO2012/026110
PCT Pub. Date: Mar. 1, 2012

(65) Prior Publication Data
US 2013/0120660 A1    May 16, 2013

(30) Foreign Application Priority Data

Aug. 26, 2010   (JP) ................. 2010-189003

(51) Int. Cl.
*G09G 3/36* (2006.01)
*H04N 5/57* (2006.01)
(Continued)

(52) U.S. Cl.
CPC ............... *H04N 5/57* (2013.01); *G02F 1/1336* (2013.01); *G02F 1/13306* (2013.01); *G09G 3/3406* (2013.01); *H04N 21/4318* (2013.01); *G02F 2001/133601* (2013.01);
(Continued)

(58) Field of Classification Search
CPC ............... G09G 2320/0646; G09G 2320/066; G09G 2320/0673; G09G 2330/021; G09G 2360/16; G09G 3/3406
USPC ........................................... 345/89, 690, 102
See application file for complete search history.

(56) References Cited

U.S. PATENT DOCUMENTS

| 7,012,625 B1 | 3/2006 | Kobayashi et al. |
| 2002/0057238 A1 | 5/2002 | Nitta et al. |

(Continued)

FOREIGN PATENT DOCUMENTS

| JP | 09-233336 A | 9/1997 |
| JP | 2001-125535 A | 5/2001 |

(Continued)

OTHER PUBLICATIONS

International Search Report for PCT/JP2011/004676 dated Dec. 6, 2011.

(Continued)

*Primary Examiner* — Long D Pham
(74) *Attorney, Agent, or Firm* — RatnerPrestia (57) ABSTRACT

In a video display control device, a control data generating section allocates a part of a dynamic range of a high gradation region of a video signal to a low gradation region, and a backlight controlling section controls a light emission luminance of a backlight so as to cancel an increase or decrease of a mean luminance of a video displayed on a screen in accordance with an increase or decrease of the mean luminance of a video signal after correction with respect to a mean luminance of the video signal.

3 Claims, 7 Drawing Sheets

(51) Int. Cl.
  *G02F 1/133* (2006.01)
  *G09G 3/34* (2006.01)
  *G02F 1/1335* (2006.01)
  *H04N 21/431* (2011.01)
  *H04N 21/44* (2011.01)

(52) U.S. Cl.
  CPC . *G09G 2320/066* (2013.01); *G09G 2320/0646* (2013.01); *G09G 2320/0673* (2013.01); *G09G 2330/021* (2013.01); *G09G 2360/16* (2013.01); *H04N 21/44008* (2013.01)

(56) References Cited

U.S. PATENT DOCUMENTS

| | | | |
|---|---|---|---|
| 2004/0201562 A1* | 10/2004 | Funamoto et al. | 345/89 |
| 2006/0139270 A1 | 6/2006 | Hong et al. | |
| 2006/0279523 A1 | 12/2006 | Nitta et al. | |
| 2008/0117160 A1 | 5/2008 | Oka et al. | |
| 2009/0052774 A1 | 2/2009 | Yoshii et al. | |
| 2009/0135208 A1* | 5/2009 | Miura | 345/690 |
| 2009/0167658 A1* | 7/2009 | Yamane et al. | 345/89 |
| 2009/0304274 A1* | 12/2009 | Yoshii et al. | 382/167 |
| 2010/0053195 A1* | 3/2010 | Harada et al. | 345/589 |

FOREIGN PATENT DOCUMENTS

| | | |
|---|---|---|
| JP | 2002-156950 A | 5/2002 |
| JP | 2006-145886 A | 6/2006 |
| JP | 2009-129251 A | 6/2008 |
| JP | 2008-160607 A | 7/2008 |
| JP | 2009-205128 A | 9/2009 |

OTHER PUBLICATIONS

Supplementary European Search Report for EP 11 81 9586, Sep. 27, 2013.

* cited by examiner

VIDEO-DISPLAY CONTROL DEVICE FOR CORRECTING A VIDEO SIGNAL AND CONTROLLING A BACKLIGHT

TECHNICAL FIELD

The present invention relates to a video display control device that controls a contrast of a video displayed on a display and a light emission luminance of a backlight.

BACKGROUND ART

In a conventional display, it is common that a contrast of a displayed video or a light emission luminance of a backlight is adjusted by a manual operation of an user. In recent years, a method of dynamically controlling a contrast of a displayed video and a light emission luminance of a backlight in accordance with an input video signal varying with the lapse of time has been proposed in order to improve image quality or reduce consumption power (see, for example, Patent Document 1). In accordance with the above method, reduction of consumption power can be achieved while raising a contrast of a displayed video.

PRIOR ART DOCUMENTS

Patent Documents

Patent Document 1: JP-A-2006-145886

SUMMARY OF INVENTION

Problems that the Invention is to Solve

However, since controlling of a contrast of a displayed video and a light emission luminance of a backlight is performed on the basis of a maximum luminance of a display in the above method, the effectiveness is sometimes lowered in an actual video in which white characters such as captions, tickers or the like are partially superimposed.

The purpose of the invention is to provide a video display control device that can achieve improvement of a contrast and reduction of consumption power even when am amplitude of a video signal is equal to a width of a dynamic range.

Means for Solving the Problems

In order to achieve the above purpose, a video display control device according to the invention is configured to control displaying of a video on a display having a screen and a backlight for emitting light toward the screen. The video display control device includes a characteristic detecting section that detects a mean luminance of a video signal input to the video display control device and a value of a histogram relating to a luminance, a control data generating section that generates control data for correcting the video signal based on values detected by the characteristic detecting section, a video signal processing section that corrects the video signal based on the control data generated by the control data generating section and outputs the corrected video signal to the display, and a backlight controlling section that controls a light emission amount of the backlight based on a difference between the mean luminance of the video signal and a mean luminance of the corrected video signal. The control data generating section generates control data which is adapted to cause the video signal processing section to perform correction of allocating a dynamic range of a high gradation region of the video signal to a low gradation region of the video signal. The backlight controlling section controls a light emission luminance of the backlight so as to cancel an increase or decrease of a mean luminance of a video displayed on the screen in accordance with an increase or decrease of the mean luminance of the corrected video signal with respect to the mean luminance of the video signal.

Advantage of the Invention

In accordance with the video display control device of the invention, a dynamic range of a high gradation region is allocated to a low gradation region and a light emission luminance of the backlight is controlled so as to cancel an increase or decrease of a mean luminance of a video to be displayed on a screen in accordance with an increase or decrease of a mean luminance of a video signal caused by the allocating. Therefore, it is possible to achieve improvement of a contrast and reduction of consumption power while maintaining a visual brightness of a video at a roughly constant level even when an amplitude of a video signal is equal to a width of a dynamic range.

MODE FOR CARRYING OUT THE INVENTION

Figure 1:
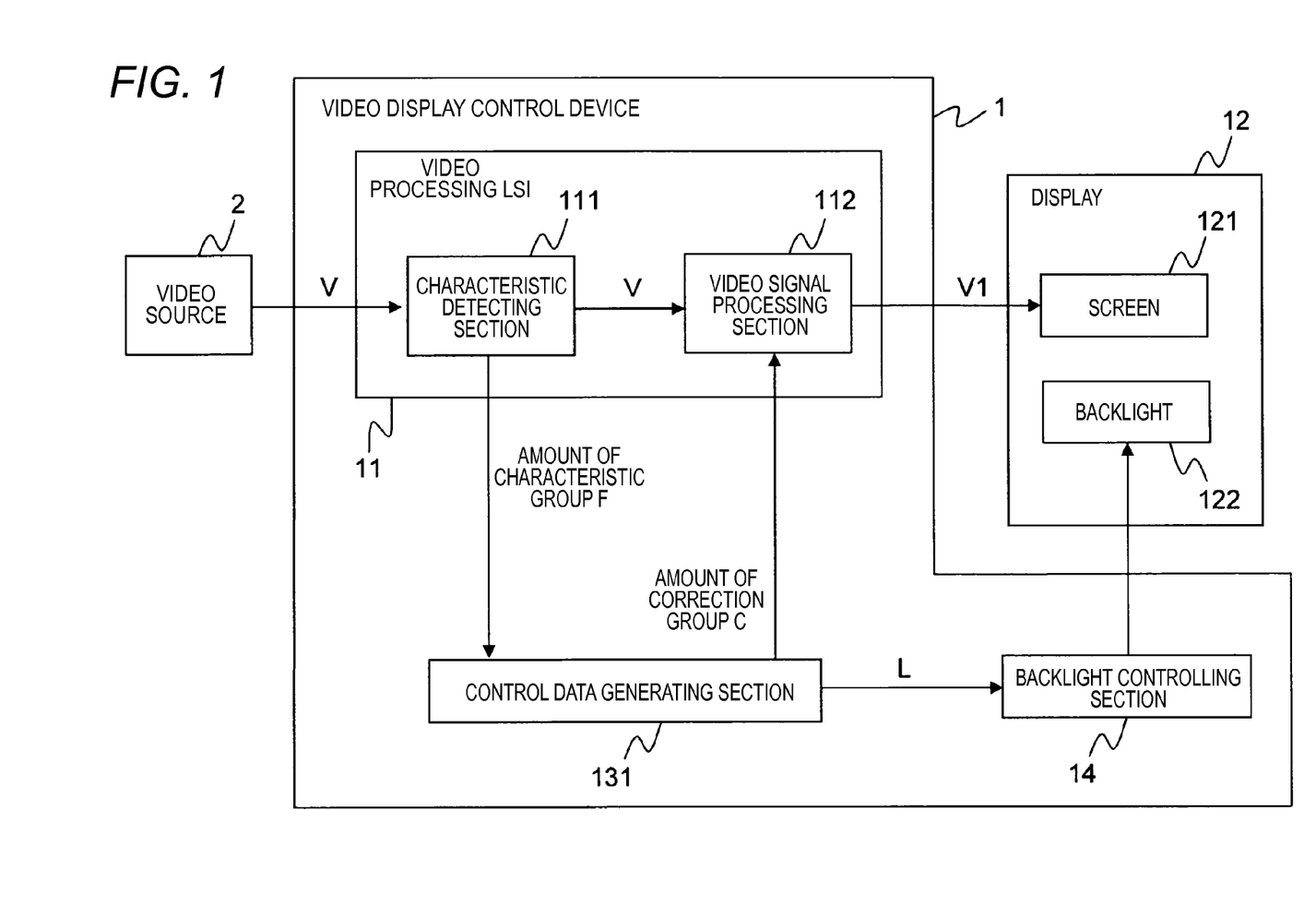
FIG. 1 is a block diagram showing structures of a video display control device and its peripherals according to an embodiment of the invention.

FIG. 1 is a block diagram showing structures of a video display control device and its peripherals according to an embodiment of the invention. As shown in FIG. 1, a video source 2 such as a DVD player or the like is connected to an input side of the video display control device 1 and a display 12 is connected to an output side thereof.

The display 12 is, for example, a liquid crystal display and is provided with at least a screen 121 and a backlight 122. A video according to a video signal V1 transmitted from the video display control device 1 is displayed on the screen 121. The backlight 122 is disposed at a back side of the screen 121, and applies light toward the screen 121 in order to display a video. Incidentally, a light emission luminance of the backlight 122 is controlled by the video display control device 1.

The video display control device 1 is provided with a video processing LSI 11, a control data generating section 131 and a backlight controlling section 14. The video processing LSI 11 applies a predetermined processing to a video signal V received from the video source 2, and outputs a video signal V1 after processing to the display 12. The video processing LSI 11 has a characteristic detecting section 111 and a video signal processing section 112.

The characteristic detecting section 111 calculates an amount of characteristic group F of a video represented by the video signal V. The characteristic detecting section 111 outputs the calculated the amount of characteristic group F to the control data generating section 131. The amount of characteristic group F is information including a mean luminance APL of the video signal V and a value of a histogram. In addition, the characteristic detecting section 111 outputs the video signal V to the video signal processing section 112 at its post-stage.

Figure 2:
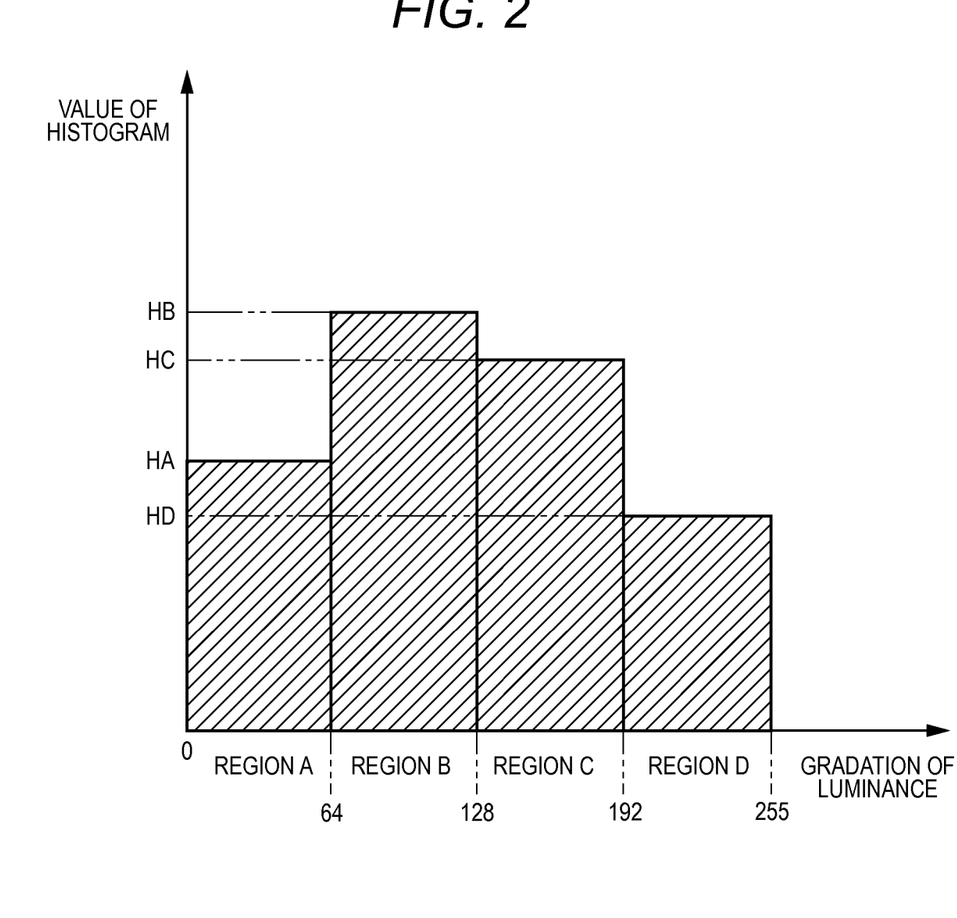
FIG. 2 is a schematic view showing an example of a histogram.

The mean luminance APL is a value obtained by dividing a total sum of luminance values of pixels in one frame indicated by the video signal V by a total number of pixels in the frame. The value of the histogram is a parameter indicating a gradient distribution of luminance in one frame of the video indicated by the video signal V. FIG. 2 is a schematic view showing an example of a histogram. In the embodiment, as shown in FIG. 2, a luminance level is represented by 256 gradations (8 bits) from 0 to 255. The characteristic detecting section 111 divides 256 gradations indicating a luminance level of each of pixels forming one frame into four regions A to D and detects a value of a histogram of each of the regions.

In the descriptions below, a value of a histogram of the region A (gradations 0 to 63) is represented by HA, a value of a histogram of the region B (gradations 64 to 127) is represented by HB, a value of a histogram of the region C (gradations 128 to 191) is represented by HC, and a value of a histogram of the region D (gradations 192 to 255) is represented by HD.

The video signal processing section 112 corrects the video signal V on the basis of the amount of correction group C received from the control data generating section 131. The video signal processing section 112 outputs the corrected video signal V1 to the display 12. An amount of correction group C is a parameter for correcting a gamma characteristic, and the detail thereof will be described later.

The backlight controlling section 14 controls a light emission luminance of the backlight 122 providing the display 12 on the basis of a luminance control signal L received from the control data generating section 131.

Figure 3:
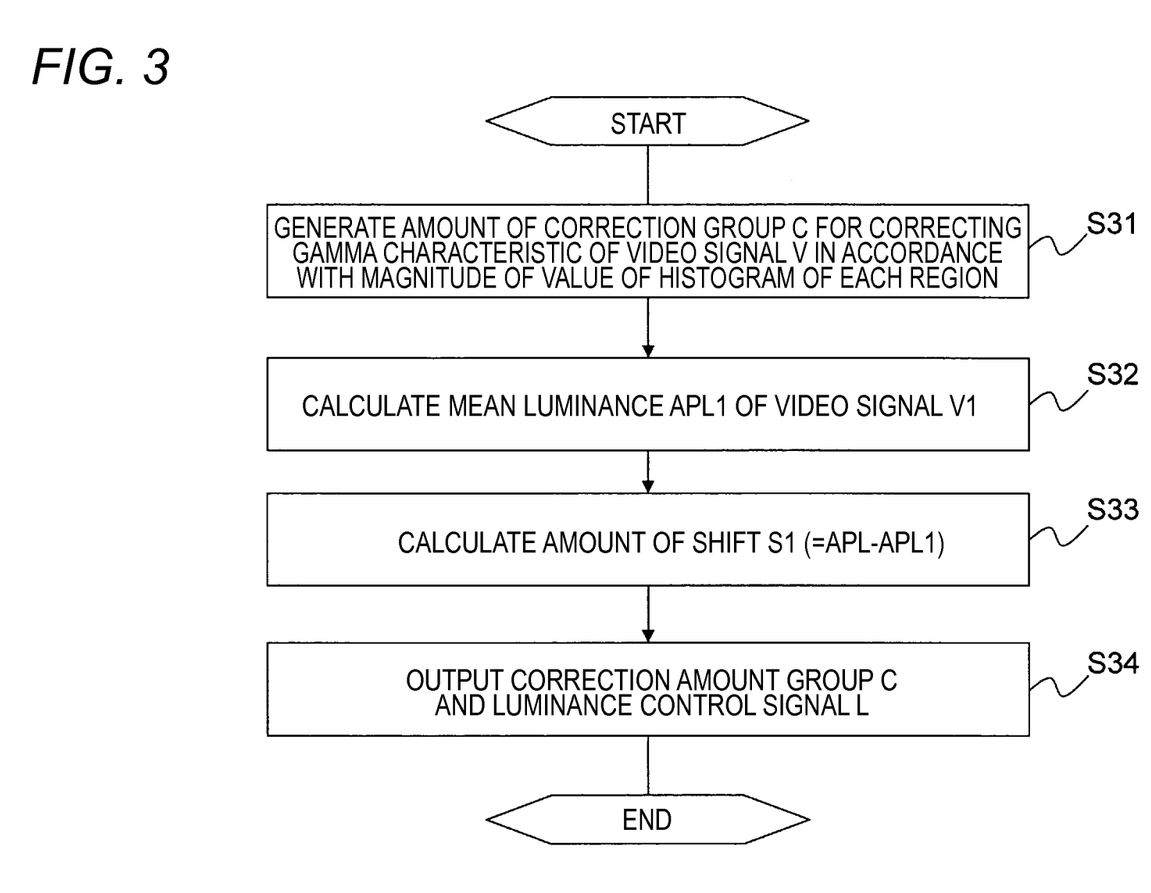
FIG. 3 is a flowchart showing an operation of a control data generating section 131.

The control data generating section 131 executes a program stored in a memory (not shown) so as to generate the amount of correction group C to be transmitted to the video signal processing section 112 and the luminance control signal L to be transmitted to the backlight controlling section 14. FIG. 3 is a flowchart showing an operation of the control data generating section 131. Hereinafter, a contrast improving process as a basic operation of the control data generating section 131 is described with reference to FIG. 3.

As shown in FIG. 3, the control data generating section 131 generates the amount of correction group C for correcting the gamma characteristic of the video signal V in accordance with magnitudes of the values HA to HD of the histograms of the video signal V included in the amount of characteristic group F obtained from the characteristic detecting section 111 (step S31). The amount of correction group C includes information indicative of slopes and intercepts of straight lines of the respective regions A to D indicating the gamma characteristic after the correction. Meanwhile, the four straight lines indicating the corrected gamma characteristic is referred to as "a line graph of gamma" in the descriptions below.

Figure 4:
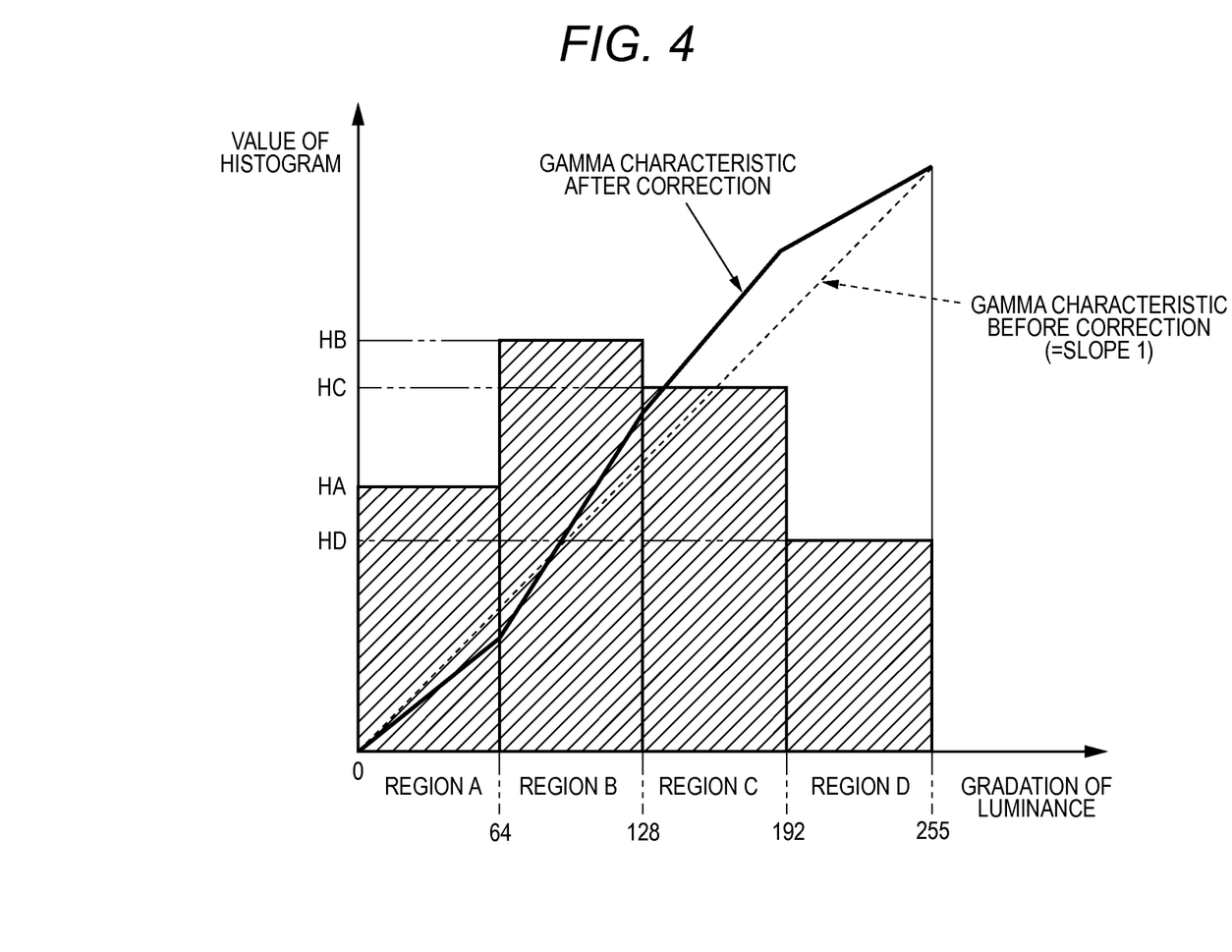
FIG. 4 is a graph showing examples of gamma characteristics pre and post correction of a video signal based on a value of the histogram shown in FIG. 2.

FIG. 4 is a graph showing gamma characteristics pre and post correction of the video signal based on a value of the histogram shown in FIG. 2. Controlling is performed such that the gamma characteristic before processing represented by one straight line indicated by a dotted line in FIG. 4 is made to be the gamma characteristic (the gamma characteristic after processing) formed of four straight lines in which the slope of the region having the large value of the histogram is made to be large and the slope of the region having the small value of the histogram is made to be small in accordance with the values of the histograms of the respective regions A to D.

When the gamma characteristic of the video signal V based on the amount of correction group C is corrected, a dynamic range of the region of which the value of the histogram is relatively large, is enlarged, but a dynamic range of the region of which the value of the histogram is relatively small, is reduced. Therefore, the further the slope after the correction is larger than the slope before the correction, the more the dynamic range is enlarged, but the further the slope after the correction is smaller than the slope before the correction, the more the dynamic range is reduced.

Incidentally, as shown in FIGS. 2 and 4, in a case that gradations 0 to 256 are divided into four regions A to D, the slopes of the straight lines indicating the gamma characteristics after the correction in the respective regions are calculated by using the following formulas. The characteristic detecting section 111 calculates the slopes of the straight lines of the respective regions on the basis of the values HA to HD of the histograms of the video signal V included in the amount of characteristic group F.

$$\text{Slope of region } A = HA/\{(HA+HB+HC+HD) \times 64\}$$

$$\text{Slope of region } B = HB/\{(HA+HB+HC+HD) \times 64\}$$

$$\text{Slope of region } C = HC/\{(HA+HB+HC+HD) \times 64\}$$

$$\text{Slope of region } D = HD/\{(HA+HB+HC+HD) \times 64\}$$

Next, the control data generating section 131 calculates a mean luminance APL1 of the video signal V1 of which the gamma characteristic is corrected, on the basis of the value of the histogram included in the amount of characteristic group F and the gamma characteristic after the correction (step S32). Next, the control data generating section 131 calculates a difference (an amount of shift S1) between the mean luminance APL1 of the video signal V1 and the mean luminance APL of the video signal V on the basis of formula (1) described below (step S33).

$$\text{Amount of shift } S1 = APL - APL1 \tag{1}$$

Next, the control data generating section 131 outputs the amount of correction group C including the slopes and the intercepts of the line graph of gamma calculated in step S31 to the video signal processing section 112 (step S34). The amount of correction group C functions as a gamma correction parameter for the video signal processing section 112. In addition, the control data generating section 131 outputs the luminance control signal L indicative of the amount of shift S1 calculated in step S33 to the backlight controlling section 14 (step S34).

The video signal processing section 112 corrects the video signal V on the basis of the amount of correction group C obtained from the control data generating section 131, and outputs the video signal V1 after the correction to the display 12. In addition, the backlight controlling section 14 increases or decreases the light emission luminance of the backlight 122 by the amount of shift S1 represented by the luminance control signal L from its reference luminance value on the basis of the luminance control signal L obtained from the control data generating section 131.

In the embodiment, since the mean luminance is lowered due to the correction of the video signal V in a case that the amount of shift S1 is a positive value, the backlight controlling section 14 controls the backlight 122 so as to cause the light emission luminance to be higher than the reference luminance value by the amount of shift S1. On the other hand, in a case that the mean luminance is increased due to the correction by the video signal processing section 112, since the amount of shift S1 becomes a negative value based on the above formula (1), the backlight controlling section 14 controls the backlight 122 so as to cause the light emission luminance to be lower than the reference luminance value by the amount of shift S1.

In accordance with the embodiment described above, the 256 gradations indicative of the luminance levels of the respective pixels in the frame indicated by the video signal are divided into the plurality of regions, and the gamma characteristics of the video signal are corrected in such a manner that the slope of the region of which the value of the histogram is relatively large is made to be increased and the slope of the region of which the value of the histogram is relatively small is made to be decreased. Therefore, a wide dynamic range is allocated to a portion of the luminance level occupying a large area with respect to the screen. Therefore, even in a case that an amplitude of the video signal is similar to a width of the dynamic range because the video partially has white characters such as closed captions, tickers or the like superimposed therein, the contrast of the video can be improved without causing harmful effect such as whiteout or the like.

In addition, the light emission luminance of the backlight 122 of the display 12 is increased or decreased on the basis of the difference between the mean luminance APL of the video signal V and the mean luminance APL1 of the video signal V1 of which the gamma characteristic is corrected. Therefore, since the light emission luminance of the backlight 122 is controlled in accordance with the mean luminance, it is possible to maintain a visual brightness of the video on the screen 121 at a roughly constant level even when the mean luminance is changed due to the correction of the gamma characteristic.

Figure 5:
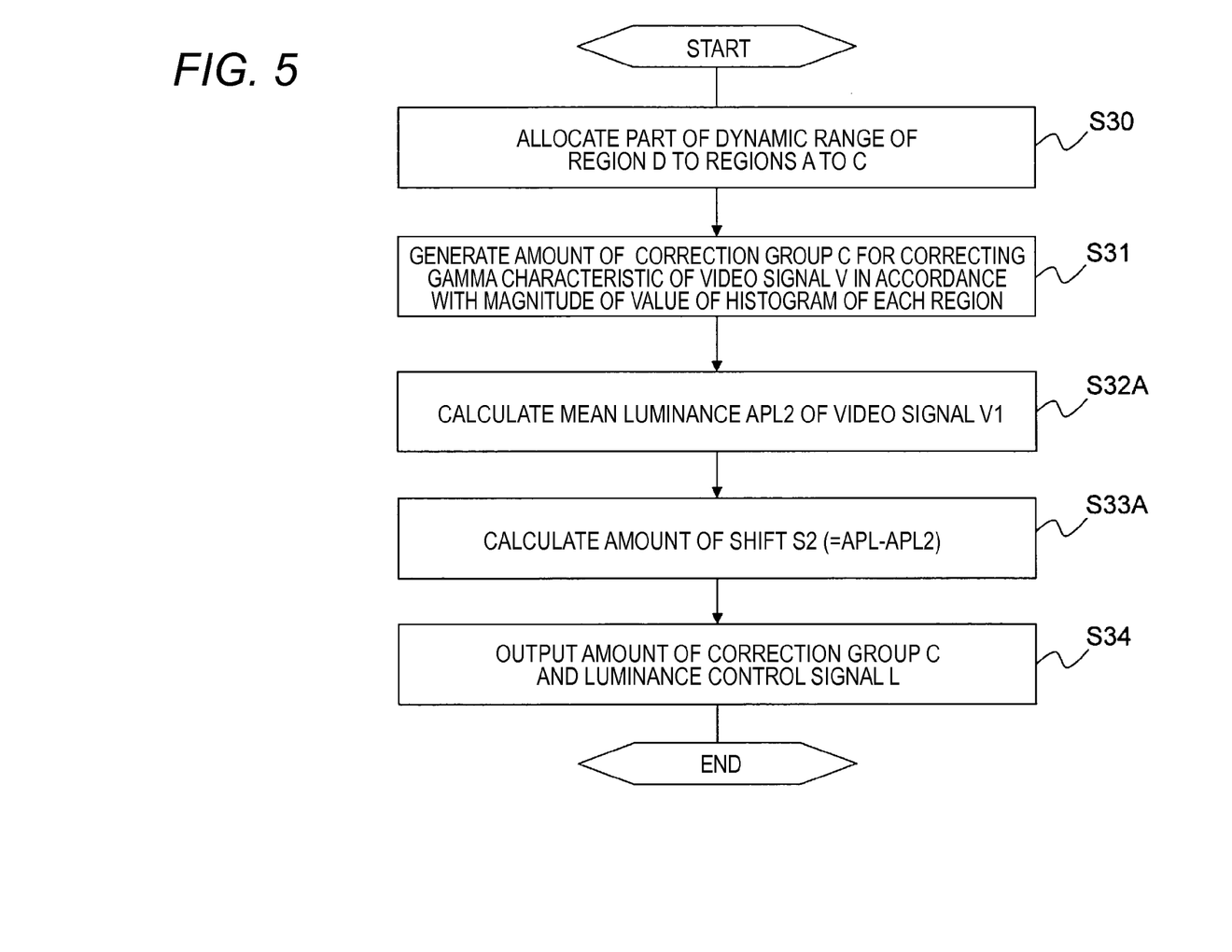
FIG. 5 is a flowchart showing an operation of the control data generating section 131, which is developed from the example shown in FIG. 3.

FIG. 5 is a flowchart showing an operation of the control data generating section 131 which is developed from the example shown in FIG. 3. Hereinafter, a process of improving a contrast and a process of reducing consumption power by the control data generating section 131 are described with reference to FIG. 5. The control data generating section 131 performs a process of allocating a part of a dynamic range allocated to a region having the highest gradation to the other ranges (step S30). In the example shown in FIG. 2, the control data generating section 131 performs a process of allocating a part of the dynamic range (the slope of the line graph of the region D) to the regions A to C.

Meanwhile, an amount of the dynamic range to be allocated from the region (the region D) having the highest gradation to the other regions (the regions A to C) can be a predetermined one, or one corresponding to a predetermined rate of the dynamic range of the region D. In addition, a distribution of the dynamic range to be allocated to each of the other regions (the regions A to C) can be equalized or weighted in a predetermined level.

Figure 6:
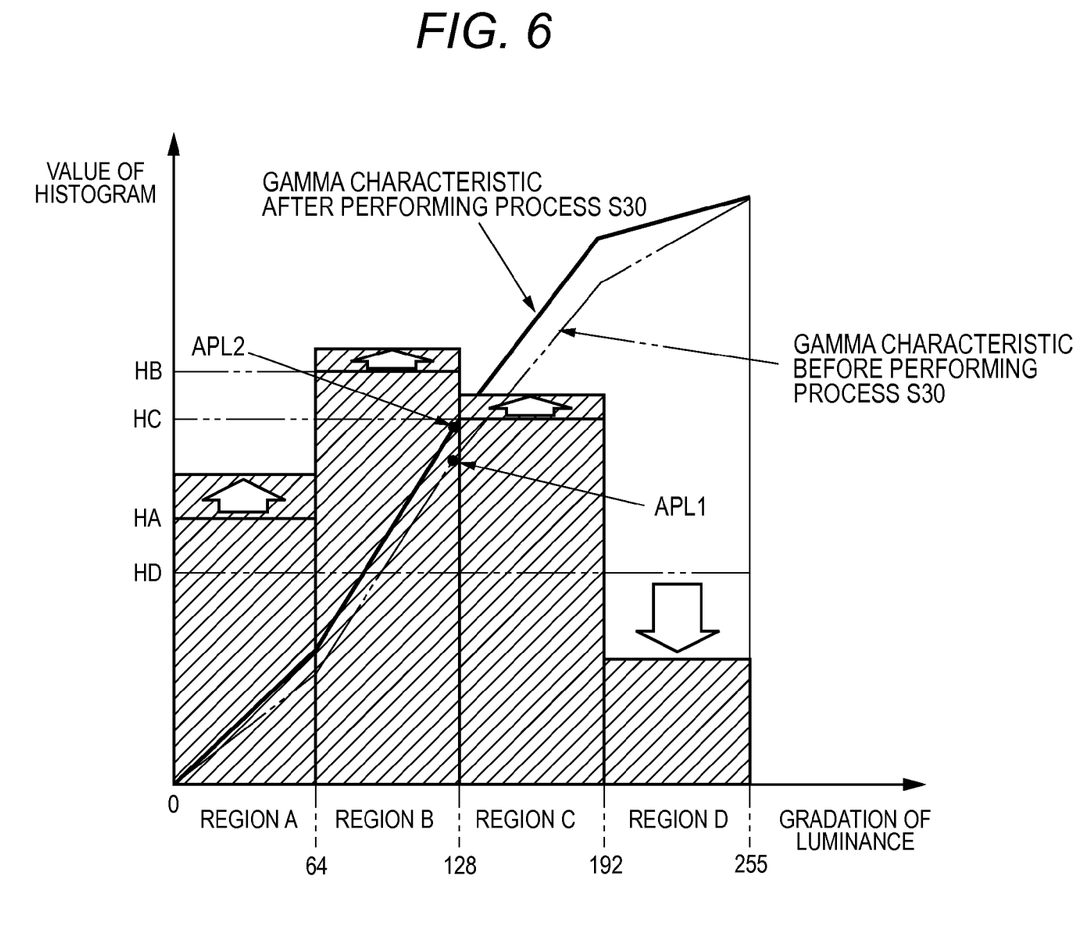
FIG. 6 is a graph showing an example of a gamma characteristic after correction based on the value of the histogram shown in FIG. 4 and an example of a gamma characteristic after correction based on a value of a histogram obtained after performing a process of step S30.

FIG. 6 is a graph showing a gamma characteristic after correction based on the value of the histogram shown in FIG. 4 and a gamma characteristic after correction based on the value of the histogram obtained after performing the process of step S30. In the example shown in FIG. 6, 40% of the dynamic range of the region D is distributed to the other regions (the regions A to C). The dynamic range distributed from the region D is distributed to the region A, the region B and the region C by respective rates of 50%, 25% and 25%.

As shown in FIG. 6, by allocating the part of the dynamic range of the region D to the regions A to C, the dynamic ranges of the regions A to C are respectively increased. Therefore, the value of the histogram of the region D is decreased and the values of the histograms of the regions A to C are increased. In this condition, the control data generating section 131 performs the process of step 31 described with reference to FIG. 3. As a result, a mean luminance APL2 of the video signal V1 corrected based on the amount of correction group C generated in step S31, becomes higher than the mean luminance APL of the video signal V. In other words, when the dynamic ranges of the regions A to C are enlarged by allocating the part of the dynamic range of the region D to the regions A to C, the luminance of the pixels belonging to the regions A to C are bit increased as a whole so that the mean luminance of the corrected video signal V1 is increased.

Next, the control data generating section 131 calculates the mean luminance APL2 of the video signal V1 of which the gamma characteristic is corrected on the basis of the value of the histogram changed in step S30 and the gamma characteristic after the correction (step S32A). Next, the control data generating section 131 calculates a difference (an amount of shift S2) between the mean luminance APL2 of the video signal V1 and the mean luminance APL of the video signal V in accordance with formula (2) described below (step S33A).

$$\text{Amount of shift } S2 = APL - APL2 \qquad (2)$$

Next, the control data generating section 131 outputs the amount of correction group C including the slopes and the intercepts of the line graph of gamma calculated in step S31 to the video signal processing section 112 (step S34). The amount of correction group C functions as a gamma correction parameter for the video signal processing section 112. In addition, the control data generating section 131 outputs the luminance control signal L indicative of the amount of shift S2 calculated in step S33A to the backlight controlling section 14 (step S34).

As shown in FIG. 6, the mean luminance APL2 of the video signal V1 to which the distribution of the dynamic range (the process of step S30) is applied, is higher than the mean luminance APL1 of the video signal V1 to which the above process is not applied. Therefore, the amount of shift S2 becomes a value which is increased in a negative direction as compared to the above described amount of shift S1. The backlight controlling section 14 controls the backlight 122 so as to decrease the light emission luminance to be smaller than the reference luminance value by the amount of shift S2. Consequently, the light emission luminance of the backlight 122 is decreased by the difference between the mean luminance APL2 and APL1 as compared to a case where the process of step S30 is not performed.

In the above description, in accordance with the examples shown in FIGS. 5 and 6, the dynamic range of the high gradation region (the region D in the example shown in FIG. 2) is allocated to the low gradation regions (the regions A to C in the example shown in FIG. 2), and the light emission luminance of the backlight 122 is decreased so as to cancel the increased amount of the mean luminance of the video signal generated in the above process. As a result, consumption power of the backlight 122 can be reduced with maintaining the visual brightness of the video on the screen 121 at a roughly constant level.

In addition, in contrast to a case where a linear gain is merely applied to a video signal, since a gain having a non-linear characteristic due to a line graph of gamma is applied to the video signal, it is possible to achieve reduction of consumption power with suppressing harmful effect in image quality such as whiteout or the like.

Therefore, since both of the process of improving a contrast and the process of reducing consumption power are performed, it is possible to achieve the reduction of the consumption power and the improvement of the contrast with maintaining the brightness of the whole screen at a constant level.

Meanwhile, in order to prevent flopping caused by varying of the parameter for gamma correction or the amount of shift of the amount of correction group C by each frame of the video, the video signal processing section 112 or the backlight controlling section 14 can perform a process or a control in response to the parameter for gamma correction or the amount of shift via a low-pass filter.

In the above description, since the gradations are divided into four regions, the line graph of gamma has four straight lines. However, the number of regions is not limited to four but can be two or more. Therefore, the line graph of gamma is formed of straight lines of which the number is the same as that of the regions.

In addition, the control data generating section 131 can change an amount of a dynamic range to be allocated to other regions from a high gradation region in accordance with a value of a histogram of the high gradation region. When controlling of decreasing the light emission luminance of the backlight 122 is performed by allocating a part of the dynamic range of the high gradation region to the other regions, a visual brightness of a low gradation region is roughly maintained at a constant level, but a peak luminance in the vicinity of a portion of white 100% is lowered. Therefore, a visual brightness in a scene including many bright pixels may be possibly lowered. However, by reducing an amount (a rate) of a dynamic range to be allocated to other regions from a high gradation region in a scene having many bright pixels, the visual brightness can be maintained at a constant level even in the scene having many bright pixels.

In step S30, the control data generating section 131 decreases the amount (the rate) of the dynamic range to be allocated to the other regions from the region D in a case that the value HD of the histogram of the region D is large, but increases the amount (the rate) of the dynamic range to be allocated to the other regions from the region D in a case that the value HD of the histogram of the region D is small.

Figure 7:
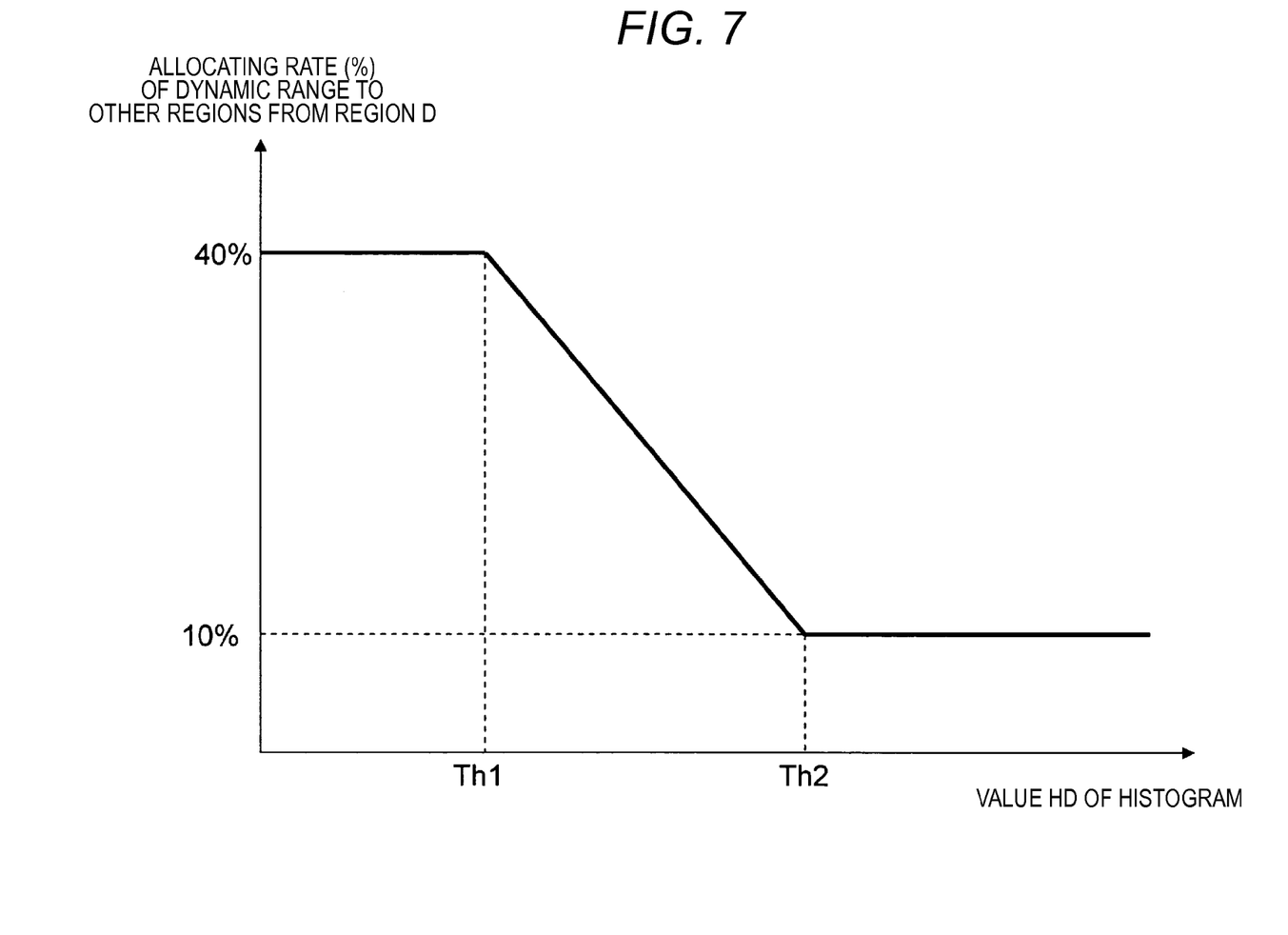
FIG. 7 is a graph showing an example of an induction reference of an amount (a rate) of a dynamic range to be allocated to other regions from a region D.

FIG. 7 is a graph showing an example of an induction reference of the amount (the rate) of the dynamic range to be allocated to the other regions from the region D. As shown in FIG. 7, the control data generating section 131 allocates 10% of the dynamic range of the region D to the other regions in a case that the value HD of the histogram is larger than a second threshold value Th2, but allocates 40% of the dynamic range of the region D to the other regions in a case that the value HD of the histogram is smaller than a first threshold value Th1. In addition, in a case that the value HD of the histogram is larger than the first threshold value Th1 and smaller than the second threshold value Th2, the control data generating section 131 allocates 10 to 40% of dynamic range of the region D to the other regions, the higher the value HD of the histogram is, the smaller the rate is. However, in a case that the value HD of the histogram is larger than the first threshold value Th1 and smaller than the second threshold value Th2, the control data generating section 131 can allocate a fixed rate of the dynamic range of the region D to the other regions, the fixed rate being between 10% to 40%.

While the invention is described in detail by referring to a specific embodiment, it is understood by those of ordinary skill in the art that various modifications and changes can be made without departing from the sprit and scope of the invention.

This application is based on Japanese Patent Application (JP-2010-189003) filed on Aug. 26, 2010, the contents of which are incorporated herein by reference.

INDUSTRIAL APPLICABILITY

The video display control device according to the invention is suitable for a control device or the like of a liquid crystal display that displays a video according to a video signal.

DESCRIPTION OF REFERENCE NUMERALS AND SIGNS 1 video display control device
11 video processing LSI
111 characteristic detecting section
112 video signal processing section
12 display
121 screen
122 backlight
131 control data generating section
14 backlight controlling device
2 video source

The invention claimed is:

1. A video display control device that controls displaying of a video on a display having a screen and a backlight for emitting light toward the screen, the video display control device comprising:
   a characteristic detecting section that detects a mean luminance of a video signal input to the video display control device and a value of a histogram relating to a luminance;
   a control data generating section that generates a control data for correcting the video signal based on values detected by the characteristic detecting section;
   a video signal processing section that corrects the video signal based on control data generated by the control data generating section and outputs a video signal after correction to the display; and
   a backlight controlling section that controls a light emission amount of the backlight based on a difference between the mean luminance of the video signal and a mean luminance of the video signal after the correction,
   wherein the control data generating section generates control data which is adapted to cause the video signal processing section to perform correction of allocating a dynamic range of a high gradation region of the video signal to a low gradation region of the video signal,
   wherein the backlight controlling section controls a light emission luminance of the backlight so as to cancel an increase or decrease of a mean luminance of video displayed on the screen in accordance with an increase or decrease of the mean luminance of the video signal after the correction with respect to the mean luminance of the video signal,
   wherein in correction of allocating the dynamic range of the high gradation region to the low gradation region, the control data generating section determines an amount or a rate of the dynamic range of the high gradation region allocated to the low gradation region in accordance with the value of the histogram of the high gradation region, and wherein in the correction of allocating the dynamic range of the high gradation region to the low gradation region, the control data generating section increases an amount or a rate of the dynamic range allocated to the low gradation region in a case that the value of the histogram of the high gradation region is smaller than a first threshold value, and decreases the amount or the rate of the dynamic range allocated to the low gradation region in a case that the value of the histogram of the high gradation region is larger than a second threshold value.

2. The video display control device according to claim 1, wherein the control data generating section decreases the more the amount or the rate of the dynamic range allocated to the low gradation region in accordance with a magnitude of the value of the histogram of the high gradation region, in a case that the value of the histogram of the high gradation region is larger than the first threshold and is smaller than the second threshold value.

3. The video display control device according to claim 1, wherein the control data indicates a gamma characteristic of the video signal after correction performed by the video signal processing section, the gamma characteristic being determined in accordance with a relative magnitude of a value of a histogram of the high gradation region and the value of the histogram of the low gradation region, and wherein the gamma characteristic of the video signal after the correction has a feature that the slope of the region of which the value of the histogram is relatively large, is made larger than the other.

* * * * *